United States Patent [19]
Davis

[11] 4,373,410
[45] Feb. 15, 1983

[54] METHOD AND APPARATUS FOR FABRICATING DIAMOND STUD ASSEMBLIES

[76] Inventor: Kenneth Davis, 3410 W. Ohio, Midland, Tex. 79701

[21] Appl. No.: 170,840

[22] Filed: Jul. 21, 1980

[51] Int. Cl.$^3$ .......................................... E21B 10/56
[52] U.S. Cl. .................................. 76/108 A; 51/309; 175/329; 175/374; 175/410; 228/193; 228/243; 269/104; 269/287
[58] Field of Search ................ 228/193, 243; 175/329, 175/330, 410, 411, 413, 374, 375; 51/297, 307, 308; 269/104, 287; 76/108 A

[56] References Cited

U.S. PATENT DOCUMENTS

| | | | |
|---|---|---|---|
| 1,841,196 | 1/1932 | Mass .................................... | 269/104 |
| 4,109,737 | 8/1978 | Bovenkerk ......................... | 175/410 |
| 4,199,035 | 4/1980 | Thompson ......................... | 175/413 |
| 4,221,270 | 9/1980 | Vezirian .............................. | 175/410 |
| 4,225,322 | 9/1980 | Knemeyer .......................... | 175/375 |

*Primary Examiner*—William F. Pate, III
*Attorney, Agent, or Firm*—Marcus L. Bates

[57] ABSTRACT

Method and apparatus for manufacturing polycrystalline diamond stud assemblies for a drill bit. The stud assembly is cylindrical in form and has a truncation at one marginal end thereof. The truncated end includes a shelf which forms a land positioned perpendicular to a back to provide a seat for the polycrystalline diamond cutter element. The land and back lie in perpendicular planes which intersect the longitudinal axial centerline of the stud. The cutter element is semicircular in form and represents a cylinder or wafer which has been bisected by cutting so that the diameter of the cylinder is received against the land while the rear face of the cutter element is received against the back. The cutter element is fabricated in a fixture having a cavity therein which receives the stud and element therewithin, and spaced abutment means so that one abutment means can be moved towards the other to place the elements of the stud assembly in compression. Between one of the abutment means and the stud assembly is a shim having a very high coefficient of expansion with respect to the stud, cutter element, and the fixture. The fixture containing the stud assembly is heated, thereby causing the rear face and bottom of the element to be bonded to the back and land of the stud. The fixture is cooled, and the finished stud assembly removed therefrom to provide an improved polycrystalline diamond cutter assembly.

12 Claims, 11 Drawing Figures

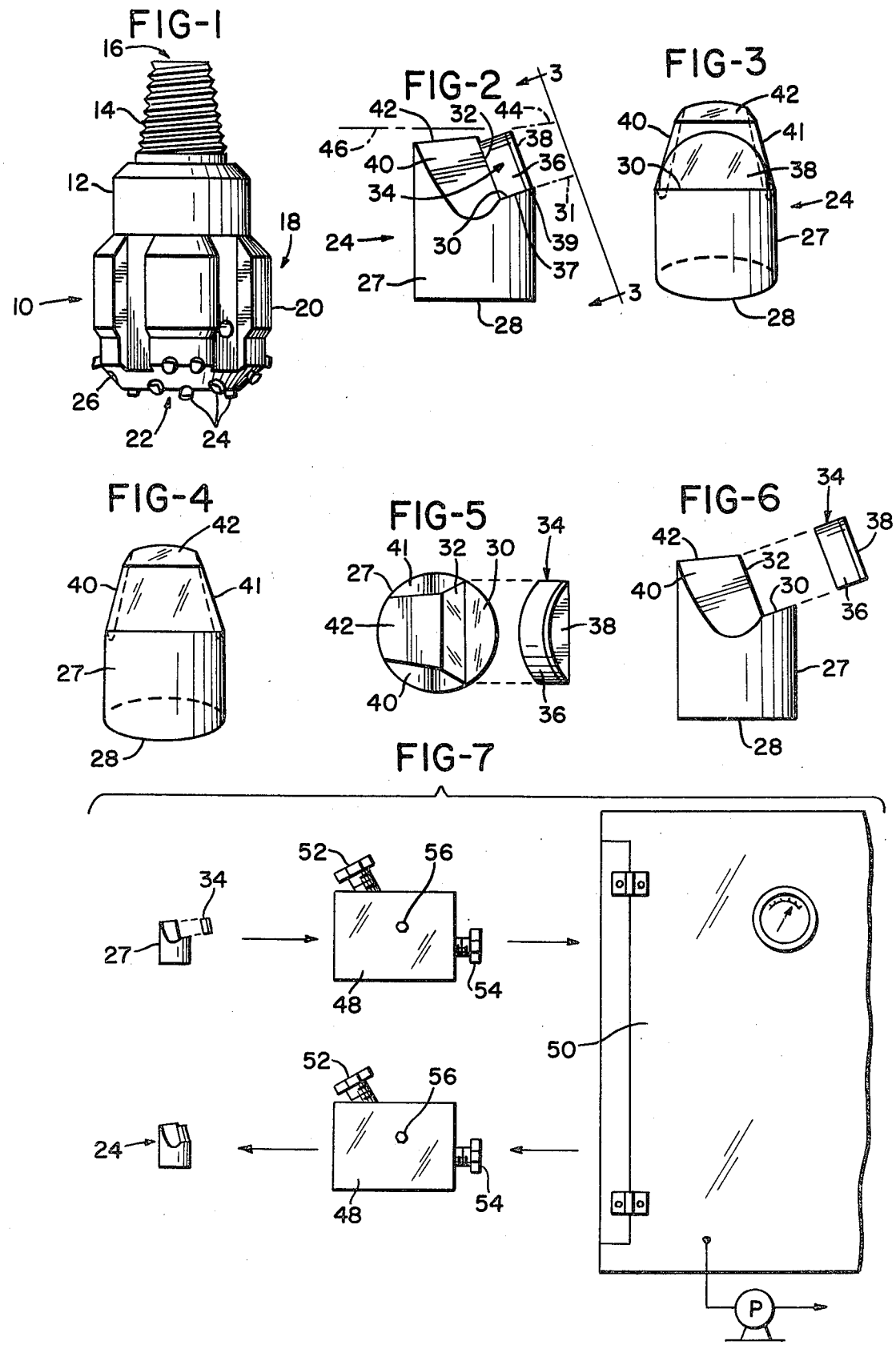

METHOD AND APPARATUS FOR FABRICATING DIAMOND STUD ASSEMBLIES

BACKGROUND OF THE INVENTION

Modern diamond drill bits have cutting members mounted thereon comprised of a stud assembly. The stud assembly is a generally cylindrical solid piece of metal having a surface formed at an acute angle respective to the longitudinal centerline thereof, so that a polycrystalline diamond cutting element can be attached thereto. The other or fixed end of the stud is fitted into the face of the bit body, with the cutting element being oriented respective to the bit face and to the other cutting elements to provide various different patterns so that great efficiency in penetrating geological formations is achieved.

The polycrystalline cutting element is made in the form of a very short cylinder, or wafer, having a layer of polycrystalline diamonds on the outer face thereof. The rear face of the cutting element is permanently attached to the inclined back formed on the stud.

After a bit has been used downhole in a borehole, it eventually becomes dull because of abrasive wear against the cutting element. The cutting element of a worn bit can be removed and rotated 180° about its axial centerline to thereby present an unused portion of the cutting face for engagement with a geological formation.

Difficulty has been experienced in bonding the cutting element to the inclined surface of the stud and it often is sheared or broken off. This presents a number of additional problems, all of which are expensive to overcome and substantially adds to the cost of drilling for hydrocarbons.

Accordingly, it would be desirable to have made available an improved method by which the cutting element is bonded to the inclined surface of the stud. It would furthermore be advantageous to be able to utilize only half of the wafer-like polycrystalline cutting element. It would especially be desirable if both of these improvements could be combined together to provide an unusual and novel stud assembly for use in a diamond drill bit. Such a stud assembly is the subject of the present invention.

SUMMARY OF THE INVENTION

This invention comprehends both method and apparatus for fabricating a new stud assembly for a diamond drill bit. The stud assembly includes a mounting stud having one end adapted to be received within the face of a drill bit, and the other end which freely depends away from the bit face receives a polycrystalline diamond cutting element thereon.

In one embodiment of the invention, the cutting element is in the form of a bisected wafer. This configuration presents a bottom, a circular wall joined to the bottom, a rear, and a front face, with there being a layer of polycrystalline diamonds attached to the front face. Another embodiment of the invention provides means for bonding the rear face and bottom of the cutter element to the stud assembly.

The stud assembly of the present invention includes a shelf formed into one marginal end of the support stud. The shelf includes a back face arranged at an acute angle respective to the longitudinal axial centerline of the stud. A land projects outwardly from the back and is arranged perpendicularly respective thereto.

The bottom and rear face of the cutting element is bonded to the land and back of the stud in accordance with the method of the present invention which comprises forming a hollow fixture which receives the support stud and cutting element therewithin, with there being two laterally arranged abutment means contained within the fixture which receives the stud and element in abutting relationship thereagainst, so that the entire unfused stud assembly can be placed under great compressive forces. A shim, made of material having a high coefficient of thermal expansion, is interposed between one of the abutment means and the assembled, unbonded stud assembly. The fixture, along with the unfused stud assembly, is heated; thereby causing the rear face and bottom of the element to be bonded to the back and land of the shelf.

After the element has been fused to the stud, the fixture is cooled, the completed stud assembly removed therefrom, to thereby provide the aforesaid improved stud assembly.

More specifically, the abutment means of the fixture includes at least one threaded member which threadedly engages the body of the fixture, so that the components of the unfused stud assembly can be placed under considerable compressive forces, with the shim being sandwiched between one of the abutment means and the outer face of the cutter element. Alignment means are arranged laterally of the abutment means for orienting the element respective to the shelf.

Accordingly, a primary object of the present invention is the provision of a new stud assembly which incorporates a semicircular cutting element therewith.

Another object of the present invention is the provision of a stud assembly for a diamond drill bit which includes a cutting element attached to a support stud in a new and improved manner.

A further object of this invention is the provision of a stud assembly for a diamond drill bit having a semicircular cutting element attached to a support stud by the provision of a shelf on the stud which increases the bond effected between the element and the stud.

Another and still further object of the present invention is the provision of a process for attaching a circular or semicircular polycrystalline diamond cutter element to a support stud.

An additional object of the present invention is the provision of a method of building a stud assembly for a diamond drill bit which fuses a polycrystalline diamond cutter element to a support stud while the element and stud are subjected to a great compressive force in an evacuated heated environment.

A still further object of this invention is to provide a method and apparatus for fabricating a stud assembly for a diamond drill bit which increases the bond between the polycrystalline diamond cutting element and the support stud therefor while at the same time reduces the cost thereof.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a side elevational view of a diamond drill bit having a plurality of stud assemblies associated therewith made in accordance with the present invention;

FIG. 2 is an enlarged, side elevational view of one of the stud assemblies seen illustrated in FIG. 1;

FIG. 3 is a side view looking in the direction indicated by the arrows at numerals 3—3 of FIG. 2.

FIG. 4 is an opposite end view of the apparatus disclosed in FIG. 3;

FIG. 5 is a top, exploded view of the apparatus disclosed in FIG. 2;

FIG. 6 is an exploded, side view of the apparatus disclosed in FIG. 2;

FIG. 7 is a flow sheet which sets forth the method of the present invention;

DETAILED DESCRIPTION OF THE PREFERRED EMBODIMENT

Figure 8:
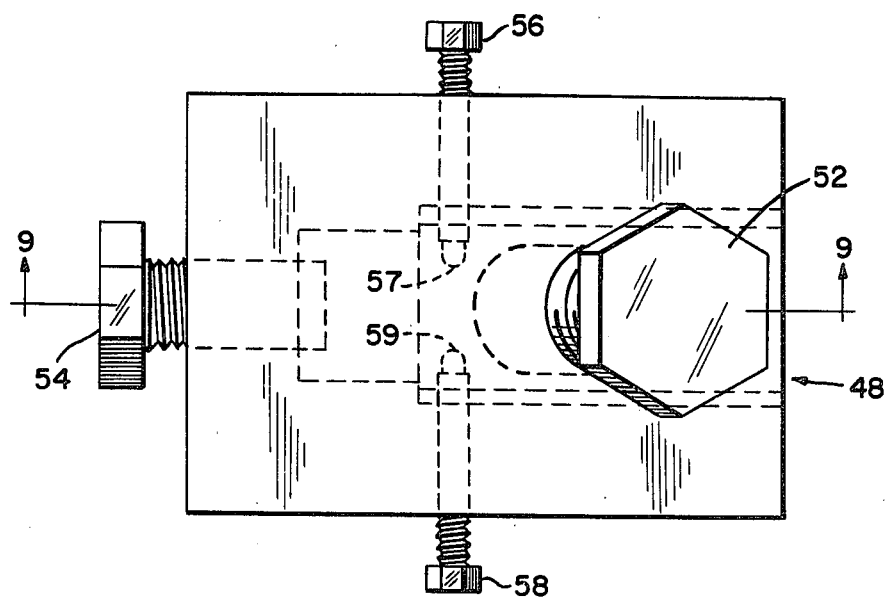
FIG. 8 is an enlarged, detailed, top plan view of part of the apparatus disclosed in FIG. 7.

FIG. 1 discloses a diamond drill bit 10 having a shank 12 and an upper threaded marginal end 14. A counterbore at 16 extends axially down through the drill bit and into the main body 18 thereof. The main body includes an enlargement at 20, with vertically disposed vent grooves being formed therein. A plurality of polycrystalline diamond stud assemblies 24, made in accordance with the present invention, are attached to the face 22 of the drill bit. A plurality of nozzles 26 are connected to passageway 16 and provide a source of drilling mud for the face of the bit.

As illustrated in FIGS. 2-6, the stud assemblies 24 each comprise a support stud 27, which preferably is cylindrical in form. The stud terminates at the lower or fixed end at bottom 28, and terminates at the free end in a shelf. The shelf comprises a land 30 which projects forwardly of a back wall 32, with the back wall and land being arranged perpendicular to one another, and with the back wall being arranged at an acute angle respective to the longitudinal axial centerline of the stud. The land lies along a plane indicated by the dot-dash line at 31.

A polycrystalline diamond cutter element 34 is received in attached relationship respective to the shelf. The cutter element is preferably in the form of a bisected wafer or disk, or short cylinder which has been bisected. The base 37 of the cutter element is connected to a circumferentially extending sidewall 36. A polycrystalline diamond face 38 is opposed to a rear wall.

The free marginal end of the stud is truncated by the opposed walls 40 and 41. The walls inwardly converge towards one another in an outward direction, with the stud terminating in a plane formed by a terminal end wall 42. Plane 44 lies at an angle respective to horizontal plane 46. The planes 44 and 46 also indicate that the outer extremity of the cutter element extends above the terminal end wall 42, while the circumferentially extending sidewall of the cutter element extends outwardly to tangentially intersect a projection of walls 40 and 41.

FIGS. 7 through 11 disclose the method of the present invention for attaching a polycrystalline diamond cutter element to a support stud to thereby provide the beforementioned stud assembly.

As particularly illustrated in FIG. 7, the stud 27 and element 34 are assembled and placed within a fixture 48, made in accordance with the present invention. The fixture containing the assembled stud and element is placed within a vacuum furnace 50 where the entire assemblage is heated. Fusion of the element to the stud occurs at the elevated temperature. The fixture containing the stud assembly is then removed from the furnace and cooled to provide the completed stud assembly as seen at 24.

As best illustrated in FIGS. 8 through 11, the fixture of this disclosure includes a main body having a pressure screw 52 which terminates in a face 53. The face provides an abutment means located within the fixture. A laterally opposed stud positioning screw 54 has a face 55 located within the fixture which forms a second abutment means. The abutment means 53 is movable towards the abutment means 55 by means of the illustrated threaded surfaces formed within the fixture and on the two screws.

Figure 10:
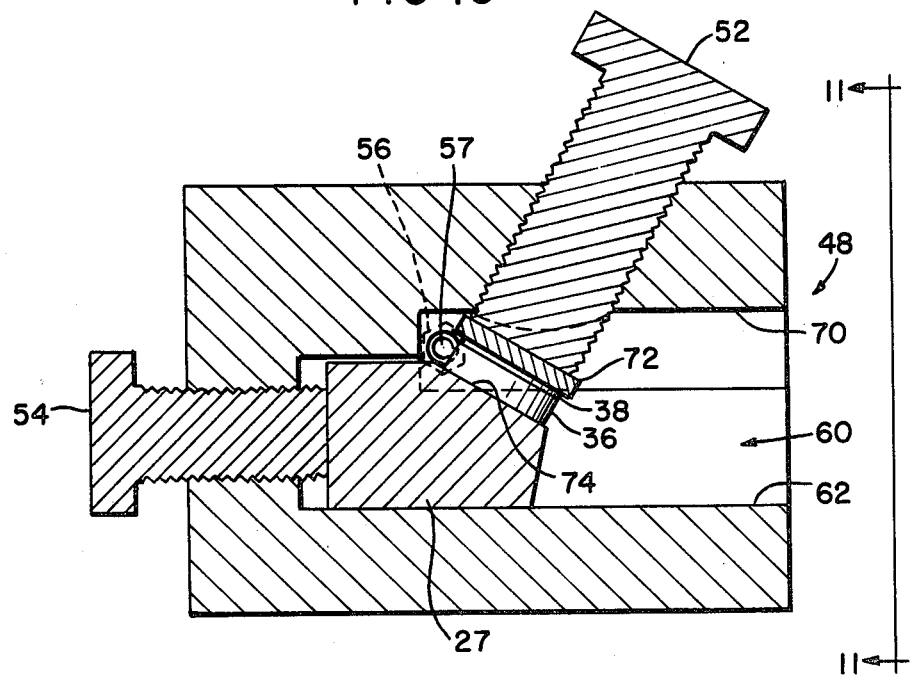
FIG. 10 is similar to FIG. 9, and additionally discloses the stud assembly of FIGS. 2-6 in operative relationship therewith.
Figure 11:
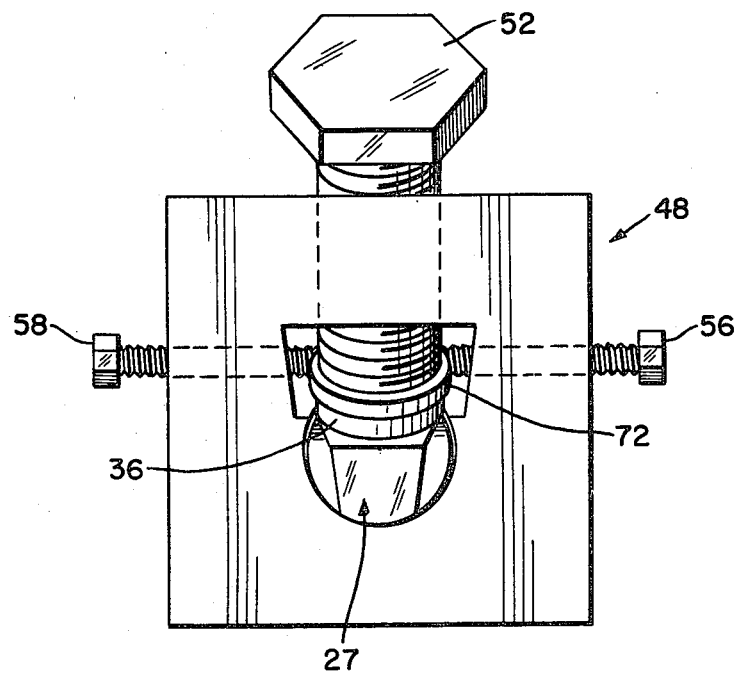
FIG. 11 is an end view looking in the direction indicated by the arrows at numeral 11—11 in FIG. 10.

Opposed cutter positioning screws 56 and 58 include terminal end portions 57 and 59 for engaging the cutter element so that the element can be moved laterally respective to the stud to thereby orient the element respective to the stud when the stud and element are contained within the fixture in the illustrated manner of FIGS. 10 and 11.

Figure 9:
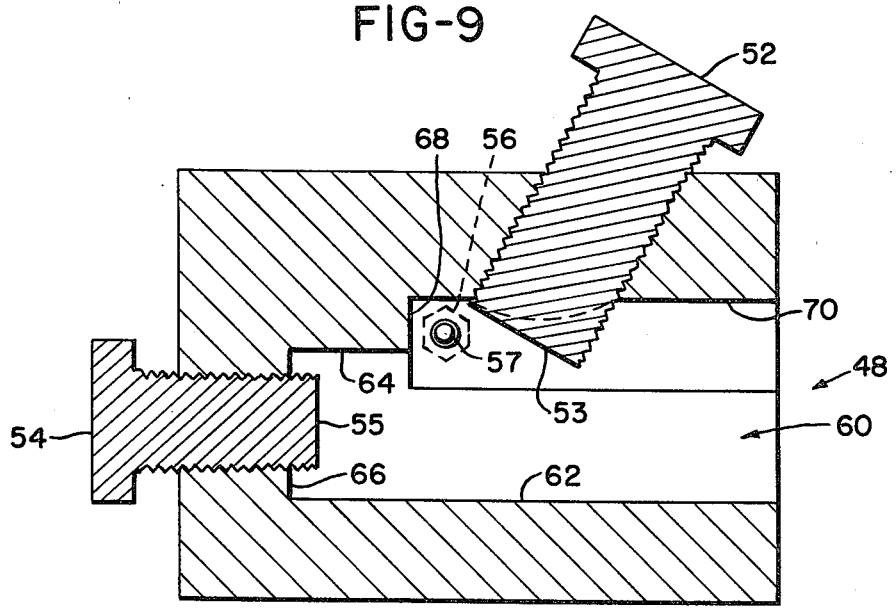
FIG. 9 is a cross-sectional view taken along line 9—9 of FIG. 8.

The fixture includes a cavity 60 of a configuration to slidably receive the stud and element therewithin. The bottom of the stud abuttingly engages abutment means 55. The cavity is formed by a lower wall 62 which conforms generally to the outer configuration of the stud. An upper shorter wall 64 is a continuation of the cylindrical lower wall and is in the form of a counterbore, as best seen in FIGS. 9 and 10. The counterbore terminates at end wall 66, while a step 68 interconnects the lower chamber with the upper chamber having an upper wall 70.

The upper wall 70 of the upper chamber terminates at the step 68. The upper chamber is of a size to sidably receive the diamond cutter element therewithin so that the element and stud can be assembled in the configuration illustrated in FIGS. 10 and 11.

A shim 72, preferably circular in form, is interposed between the abutment means 53 and the diamond face of the element so that the shim can force the element towards the stud while the stud is forced toward the element by the other abutment means, thereby placing the shim, element, and stud in great compression. The lower wall 62 of the lower chamber resolves the lateral forces between the two abutment means to attain the compressive force at 74. Bonding material for fusing the cutter element to the stud shelf is applied at 74 for a circular element, and at 32, 37 (FIG. 2) for a semicircular element.

In operation, the stud assembly of FIGS. 2-6 is fabricated by bisecting a polycrystalline diamond cutter disk into a semicircular element 34, and fusing the resultant element to the shelf of a stud in accordance with the present invention. The stud is fabricated by grinding the sides 41 and 40 after the shelf has been milled to form the support land and back. The stud is next placed into the operative position illustrated in FIGS. 10 and 11. The cutter element is positioned laterally of the cavity by utilizing the opposed positioning screw members 56 and 58. The pressure screw 52 is made up against the shim so that the element is firmly pressed against the bonding material applied at 74.

The entire fixture is then placed into an evacuated furnace for a sufficient length of time to assure that the rear face of the element has properly bonded to the shelf at both the back and the land of the shelf. The fixture is then removed from the oven and allowed to cool, whereupon, the completed stud assembly can be removed therefrom and subsequently placed into an appropriate counterbore formed in the face of a drill bit, such as exemplified by the bit structure of FIG. 1.

The polycrystalline diamond cutter element preferably is comprised of a polycrystalline diamond layer intimately bonded to a cemented tungsten carbide substrate. This cutter element is then bonded to a stud, and the completed assembly is either of the embodiments shown in FIGS. 2 or 10 of the drawings, so far as regards the process of FIG. 7.

The cutter element can be bonded to the stud by prior art difusion bonding methods, as for example, using a hot isostatic pressing, wherein the cutter is positioned on the stud and the assembly is placed in a graphite filled can. The can is evacuated and hermetically sealed, and then placed in an autoclave where the external pressure is increased to about 30,000 psi and the temperature is elevated to about 1300° F. The can collapses, placing the cutter and stud under isostatic pressure whereupon bonding is complete after several hours.

This prior art process has the advantage of providing a bond of excellent quality. Furthermore, many cutter stud assemblies can be assembled in a can and simultaneously processed. However, the capital cost of an autoclave is considerable, and furthermore, should the can leak, the entire contents will exhibit a poor bond.

In the present invention, difusion bonding of the cutter to the stud is achieved in a low cost vacuum furnace. The fixture is low in cost and simple in construction. The cutter element and stud together with the shim is placed into the low cost fixture so that thermal expansion forces the stud assembly into great compression which develops the aforesaid high pressure so that the fusion bonding of the cutter element to the face of the stud is achieved in a satisfactory manner.

Most polycrystalline diamond cutter drill bits employ a circular cutter element such as exemplified in FIGS. 10 and 11. A drill bit becomes dull when only a portion of the cutter element has been worn away, which is wasteful since only a small part of the diamond layer is used to destroy the rock formation. It has previously been proposed that a half-round polycrystalline diamond cutter element (as seen in FIGS. 2-7) be used in a drill bit. However, when a half-round cutter element is mounted on a prior art stud, the bonding area is reduced by half, and therefore the forces acting on the half-round cutter can shear it from the stud.

The present invention overcomes this deficiency by the provision of a shelf wherein a support land cut into the stud accepts the flat edge or bottom of the half-round cutter element. The land resists the forces which tend to shear the half-round cutter element from the stud.

Half-round cutter elements usually are made by cutting a full round cutter disk in half. Since the kerf of the cut is finite, the half-round cutter element is really not exactly semicircular, but instead is a segment of a circle. In the present disclosure, the term "semicircular" is intended to embrace this terminology.

The cutter element can be fused to the shelf by relying upon high temperature and pressure at the clean interface formed therebetween; or, a fusing material, such as nickel or high temperature brazing material can be applied at the interface. The fusing material can be applied to the interface as a thin foil, and can be selected from any suitable material which difuses into both the stud and disk surfaces.

The fixture preferably is made from a material having a relatively low coefficient of expansion, such as the alloys invar, 4140 steel, the stainless steels, and the like. The shim is made of a material having a relatively high coefficient of expansion, such as brass, copper, bronze, and silver.

The polycrystalline diamond disk is commercially available from General Electric Co.

I claim:

1. Method for making a polycrystalline diamond stud assembly for a drill bit, comprising the steps of:
    (1) making a support stud for supporting a polycrystalline diamond cutter element;
    (2) providing a diamond cutter element;
    (3) preparing the surface between said element and said stud so that the element can subsequently be fused to the stud;
    (4) placing the stud of step (1) and the element of step (2) into a fixture;
    (5) aligning the stud and element respective to one another so that the element is positioned in its operative cutting position respective to the stud;
    (6) selecting a shim having a relatively high coefficient of thermal expansion respective to the stud, element, and fixture;
    (7) placing the shim of step (6) adjacent to one of the outer face of the element and the lower terminal end of the stud;
    (8) forcing the shim and stud towards one another to thereby force the element towards the stud; and, mechanically immovably holding the shim, stud, element, and fixture together in fixed relationship respective to one another;
    (9) heating the fixture containing the stud, element, and shim until fusion occurs between the element and stud; whereupon, the coefficient of thermal expansion of the shim causes the stud and element to be forced towards one another with a force which increases in proportion to the temperature elevation;
    (10) cooling the fixture of step (9), removing the stud and fused element from the fixture, thereby providing the aforesaid polycrystalline diamond cutter assembly.

2. The method of claim 1 and further including the step of providing said fixture with spaced abutment means therewithin; moving said abutment means relative to one another to engage the stud and shim to thereby place the element and stud in compression and exert a pressure at the interface between the stud and element.

3. The method of claim 2 wherein the shim is selected from the group consisting of brass, copper, bronze and silver.

4. The method of claim 3 wherein step (8) is carried out by threadedly engaging one of the spaced abutment means with the fixture so that the threaded abutment means can be made up to place the shim, element, and stud in compression.

5. The method of claim 4 wherein step (5) is carried out by providing alignment means transverse of the fixture to enable said element to be moved respective to said stud.

6. The method of claim 1 wherein said step (9) is carried out by using a vacuum furnace for heating the stud and element to a temperature which fuses the element to the stud.

7. Apparatus for making a polycrystalline diamond stud assembly for a drill bit, comprising:
a fixture, a cavity formed within said fixture for removably receiving a support stud and cutter element therewithin;
first and second abutment means located within said cavity and placed laterally respective to one another and connected to the fixture, said first abutment means has a surface formed thereon for engaging the stud of a stud assembly, said second abutment means has a face thereon for engaging the face of the element of a stud assembly;
one of said first and second abutment means being movable respective to the other of said first and second abutment means to cause a cutter assembly which may be located therebetween to be placed into compression;
one of said first and second abutment means includes a shim means made of a material having relatively high coefficient of expansion, said shim means being interposed between the stud assembly and one of said abutment means; said shim, stud, element, and fixture are mechanically held together in fixed relationship respective to one another;
an alignment means for enabling the element to be moved laterally respective to the stud after the stud and element have been received between said abutment means;
so that when the fixture containing the stud and element is heated, the element is fused to the stud with great force being exerted at the interface between the element and stud due to the difference in coefficient of expansion of the shim respective to the fixture, stud, and element.

8. The apparatus of claim 7 wherein one of said abutment means is a threaded member which threadedly engages the fixture, so that the last recited abutment means can force the stud and element into compression before the fixture is heated, and the shim, when subsequently heated, will provide additional compressive force.

9. The apparatus of claim 8 wherein said cavity of the fixture includes a counterbore of a size to slidably receive the stud therewithin, and a chamber overlying and connected to the counterbore within which the element is slidably received;
said first and second abutment means lie in a common plane which bisects the counterbore, said alignment means are guide members which threadedly engage the fixture and are positioned in a common plane which is perpendicular to the first recited plane.

10. Apparatus for attaching a polycrystalline diamond cutter element to a support stud for a drill bit, comprising:
a fixture in the form of a unitary body having a cavity formed therewithin for removably receiving a support stud and cutter element; abutment means located within said cavity and placed laterally respective to one another, said abutment means are connected to the fixture, one of said abutment means has a surface formed thereon for engaging the stud of a stud assembly, another of said abutment means has a face thereon for engaging the face of the element of a stud assembly;
one of said abutment means is movable respective to the other of said abutment means so that a cutter assembly which may be located between said abutment means is placed into compression;
one of said abutment means includes a shim means made of a material having relatively high coefficient of expansion, said shim means being interposed between a stud assembly and one of said abutment means; said shim, stud, element, and fixture are mechanically held together in fixed relationship respective to one another;
alignment means for moving an element laterally respective to a stud after the stud and element have been received within the cavity of the fixture;
whereby, the fixture containing a stud and element therewithin can be heated, whereupon the element is fused to the stud with great force being exerted at the interface between the element and stud due to the difference in coefficient of expansion of the shim respective to the fixture, stud, and element.

11. The apparatus of claim 10 wherein one of said abutment means is a threaded member which threadedly engages the fixture, so that the last recited abutment means can force the stud and element into compression before the fixture is heated, and the shim, when subsequently heated, will provide additional compressive force.

12. Method of attaching a polycrystalline diamond cutter element to a support stud for a drill bit, comprising the steps of:
(1) providing a support stud for supporting a polycrystalline diamond cutter element; and providing a diamond cutter element;
(2) preparing the surface between said cutter element and said stud so that the cutter element can subsequently be fused to the stud;
(3) placing the stud and the element of step (1) into a cavity formed within a holding fixture;
(4) aligning the stud and element respective to one another so that the element is positioned in its operative cutting position respective to the stud;
(5) selecting a shim having a relatively high coefficient of thermal expansion respective to the stud, element, and fixture;
(6) placing the shim of step (5) adjacent to one of the outer face of the element and the lower terminal end of the stud;
(7) forcing the shim and stud towards one another to thereby force the element towards the stud; and, mechanically holding the shim, stud, element, and fixture together in fixed relationship respective to one another;
(8) heating the fixture containing the stud, element, and shim until fusion occurs between the element and stud;
(9) cooling the fixture of step (8), removing the stud and fused element from the fixture, thereby providing the aforesaid polycrystalline diamond cutter assembly.

* * * * *

UNITED STATES PATENT AND TRADEMARK OFFICE
CERTIFICATE OF CORRECTION

PATENT NO. : 4,373,410
DATED : February 15, 1983
INVENTOR(S) : Kenneth Davis

It is certified that error appears in the above—identified patent and that said Letters Patent is hereby corrected as shown below:

Column 4, line 47, correct the spelling of "slidably".

Column 5, line 24, correct the spelling of "diffusion";

Line 39, correct the spelling of "diffusion".

Column 6, line 10, correct the spelling of "diffuses".

Claim 6, line 7, delete "said" after wherein.

Signed and Sealed this

Twenty-eighth Day of June 1983

[SEAL]

Attest:

GERALD J. MOSSINGHOFF

Attesting Officer

Commissioner of Patents and Trademarks